US009729440B2

United States Patent
Itkin

(10) Patent No.: US 9,729,440 B2
(45) Date of Patent: Aug. 8, 2017

(54) DIFFERENTIATING AMONG MULTIPLE MANAGEMENT CONTROL INSTANCES USING IP ADDRESSES

(71) Applicant: MELLANOX TECHNOLOGIES LTD., Yokneam (IL)

(72) Inventor: Yuval Itkin, Zoran (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 180 days.

(21) Appl. No.: 14/628,256

(22) Filed: Feb. 22, 2015

(65) Prior Publication Data

US 2016/0248619 A1   Aug. 25, 2016

(51) Int. Cl.
G06F 15/173 (2006.01)
H04L 12/741 (2013.01)
H04L 12/26 (2006.01)

(52) U.S. Cl.
CPC ............ *H04L 45/74* (2013.01); *H04L 43/028* (2013.01)

(58) Field of Classification Search
USPC ................................................ 709/223, 227
See application file for complete search history.

(56) References Cited

U.S. PATENT DOCUMENTS

| 5,805,816 | A  | 9/1998  | Picazo et al. |
| 6,198,752 | B1 | 3/2001  | Lee |
| 6,289,388 | B1 | 9/2001  | Disney et al. |
| 6,393,483 | B1 | 5/2002  | Latif et al. |
| 7,046,668 | B2 | 5/2006  | Pettey et al. |
| 7,103,064 | B2 | 9/2006  | Pettey et al. |
| 7,245,627 | B2 | 7/2007  | Goldenberg |
| 7,447,778 | B2 | 11/2008 | Matters et al. |
| 7,457,906 | B2 | 11/2008 | Pettey et al. |
| 7,464,174 | B1 | 12/2008 | Ngai |
| 7,493,416 | B2 | 2/2009  | Pettey |
| 7,502,370 | B2 | 3/2009  | Pettey |
| 7,512,717 | B2 | 3/2009  | Pettey |
| 7,519,167 | B2 | 4/2009  | Jreij et al. |
| 7,600,112 | B2 | 10/2009 | Khatri et al. |

(Continued)

FOREIGN PATENT DOCUMENTS

CN   103546586 A   1/2014

OTHER PUBLICATIONS

DMTF Standard, "Management Component Transport Protocol (MCTP) Base Specification", Document No. DSP0236,version 1.2.0, 87 pages, Jan. 24, 2013.

(Continued)

*Primary Examiner* — Joseph E Avellino
*Assistant Examiner* — Marshall McLeod
(74) *Attorney, Agent, or Firm* — D. Kligler IP Services Ltd.

(57) ABSTRACT

A network adapter includes one or more ports and circuitry. The one or more ports are configured to connect to a communication network. The circuitry is coupled to a network node that includes multiple hosts, and is configured to exchange management packets between a control server and a Baseboard Management Controller (BMC) that runs at least first and second BMC instances that share a single MAC address and are associated respectively with first and second hosts, and to exchange, over the communication network via the one or more ports, data packets between the hosts and one or more remote nodes.

21 Claims, 2 Drawing Sheets

(56) References Cited

U.S. PATENT DOCUMENTS

| | | |
|---|---|---|
| 7,617,333 B2 | 11/2009 | Pettey |
| 7,620,057 B1 | 11/2009 | Aloni et al. |
| 7,620,064 B2 | 11/2009 | Pettey et al. |
| 7,620,066 B2 | 11/2009 | Pettey et al. |
| 7,664,909 B2 | 2/2010 | Pettey |
| 7,668,941 B1 | 2/2010 | Kathandapani |
| 7,688,838 B1 | 3/2010 | Aloni et al. |
| 7,705,850 B1 | 4/2010 | Tsu |
| 7,706,372 B2 | 4/2010 | Pettey et al. |
| 7,782,893 B2 | 8/2010 | Pettey et al. |
| 7,925,795 B2 | 4/2011 | Tamir et al. |
| 8,032,659 B2 | 10/2011 | Pettey |
| 8,228,848 B2 | 7/2012 | Vos et al. |
| 8,346,884 B2 | 1/2013 | Pettey |
| 8,400,917 B2 | 3/2013 | Tripathi et al. |
| 8,503,468 B2 | 8/2013 | Akyol et al. |
| 8,913,615 B2 | 12/2014 | Pettey |
| 9,197,490 B2 | 11/2015 | Dharmadhikari |
| 2003/0130969 A1 | 7/2003 | Hawkins et al. |
| 2007/0002826 A1 | 1/2007 | Bennett et al. |
| 2007/0233455 A1* | 10/2007 | Zimmer .................. G06F 9/546 703/27 |
| 2008/0043769 A1 | 2/2008 | Hirai |
| 2008/0080512 A1* | 4/2008 | Gofman ............ H04L 29/12028 370/392 |
| 2008/0086580 A1 | 4/2008 | Zhang et al. |
| 2008/0183882 A1 | 7/2008 | Flynn et al. |
| 2009/0100194 A1 | 4/2009 | Bhadri et al. |
| 2009/0182799 A1 | 7/2009 | Huang |
| 2009/0232136 A1 | 9/2009 | Rodriguez et al. |
| 2011/0040917 A1 | 2/2011 | Lambert et al. |
| 2011/0078299 A1 | 3/2011 | Nagapudi et al. |
| 2012/0218905 A1 | 8/2012 | Pettey |
| 2012/0221705 A1 | 8/2012 | Pettey |
| 2012/0250689 A1 | 10/2012 | Pettey |
| 2013/0145072 A1 | 6/2013 | Venkataraghavah et al. |
| 2013/0289926 A1* | 10/2013 | Maity .................. G06F 9/45533 702/130 |
| 2013/0304903 A1 | 11/2013 | Mick et al. |
| 2014/0059225 A1 | 2/2014 | Gasparakis et al. |
| 2014/0059266 A1 | 2/2014 | Ben-Michael et al. |
| 2014/0129741 A1 | 5/2014 | Shahar et al. |
| 2014/0195657 A1 | 7/2014 | Bhatia et al. |
| 2014/0195669 A1 | 7/2014 | Bhatia et al. |
| 2014/0195704 A1 | 7/2014 | Bhatia et al. |
| 2014/0229758 A1 | 8/2014 | Richardson et al. |
| 2014/0280837 A1 | 9/2014 | Ayanam et al. |
| 2014/0280947 A1 | 9/2014 | Christopher et al. |
| 2014/0344431 A1 | 11/2014 | Hsu et al. |
| 2015/0172112 A1 | 6/2015 | Itkin et al. |

OTHER PUBLICATIONS

DMTF Standard, "Network Controller Sideband Interface (NC-SI) Specification",Document No. 10 DSP0222, version 1.0.1, 124 pages, Jan. 24, 2013.
DMTF Standard, "NC-SI over MCTP Binding Specification," Document No. DSP0261, version 1.0.0, 31 pages, Aug. 22, 2013.
SBS Implementers Forum, "System Management Bus (SMBus) Specification",version 2.0 , 59 pages, Aug. 3, 2000.
Intel Corporation, "Preboot Execution Environment (PXE) Specification",version 2.1, 103 pages, Sep. 20, 1999.
AMD, "Magic Packet Technology," publication No. 20213, revision A, Amendment/0, 6 pages, Nov. 1995.
Intel et al., "IPMI—Intelligent Platform Management Interface Specification, second generation", version 2.0, revision 1.1 , 644 pages, Oct. 1, 2013.
Linux Bonding Driver Documentation, 43 pages, Apr. 27, 2011.
IEEE Standard 802.1AX "IEEE Computer Society Standard for Local and metropolitan area networks—Link Aggregation", 163 pages, Nov. 3, 2008.
Itkin., U.S. Appl. No. 14/700,206 dated Apr. 30, 2015.
PCT Express Base Specification, Revision 3.0, 860 pages, Nov. 10, 2010.
Budruk et al., PCI Express System Architecture, 222 pages, Apr. 2008.
PCT Express to PCI/PCI-X Bridge Specification, Revision 1.0., 176 pages, Jul. 14, 2003.
Itkin et al., U.S. Appl. No. 14/583,124 dated Dec. 25, 2014.
DMTF Standard, "Management Component Transport Protocol (MCTP) SMBus/I2C Transport Binding Specification", Document No. DSP0237, version 1.1.0, 42 pages, Jul. 28, 2009.
DMTF Standard, "Management Component Transport Protocol 5 (MCTP) PCIe VDM Transport Binding 6 Specification", Document No. DSP0238, Version 1.1.2, 19 pages, Dec. 7, 2014.
Patrick, M.,"DHCP Relay Agent Information Option", IETF Network Working Group, RFC 3046, 14 pages, Jan. 2001.
Miles et al., "Lightweight DHCPv6 Relay Agent", IETF, RFC 6221, 18 pages, May 2001.
U.S. Appl. No. 13/467,161 OA dated Feb. 5, 2015.
U.S. Appl. No. 14/547,160 Office Action dated Jul. 28, 2016.
U.S. Appl. No. 14/547,160 Office Action dated Jan. 3, 2017.

* cited by examiner

US 9,729,440 B2

DIFFERENTIATING AMONG MULTIPLE MANAGEMENT CONTROL INSTANCES USING IP ADDRESSES

FIELD OF THE INVENTION

The present invention relates generally to communication systems, and particularly to methods and systems for remote host management.

BACKGROUND OF THE INVENTION

In various computing systems, multi-host computing nodes are equipped with a dedicated management controller that communicates with a control server over the network for the purpose of remote monitoring and control. For example, Patent Application Publication U.S. 2014/0280837, whose disclosure is incorporated herein by reference, describes a baseboard management controller (BMC) managing a computer system including N computer nodes, N being an integer greater than one. The BMC comprises a processor, a first communication interface controller and a memory. The memory stores a firmware, and the firmware is executed by the processor. The firmware, is configured to dynamically obtain the value of N, and to initiate N virtual BMC stacks each managing at least one health or performance related aspect of a respective one of the N computer nodes. The first and second virtual BMC stacks of the N virtual BMC stacks communicate, through the first communication interface controller, with the first and second computer nodes of the N computer nodes, respectively.

As another example, U.S. Pat. No. 7,668,941, whose disclosure is incorporated herein by reference, describes methods and systems for implementing a network protocol stack and a web interface within a management module. A network controller supports utilizing a plurality of media access control (MAC) addresses. The method involves configuring the network controller to allocate one of the MAC addresses to the management module where the management module is utilized in monitoring operations associated with the computer system. The network controller is programmed to send to the management module, via the system interface, all network packets addressed to the MAC address allocated to the management module. The TCP/IP stack and the web interface are provided within the management module.

SUMMARY OF THE INVENTION

An embodiment that is described herein provides a network adapter that includes one or more ports and circuitry. The one or more ports are configured to connect to a communication network. The circuitry is coupled to a network node that includes multiple hosts, and is configured to exchange management packets between a control server and a Baseboard Management Controller (BMC) that runs at least first and second BMC instances that share a single MAC address and are associated respectively with first and second hosts, and to exchange, over the communication network via the one or more ports, data packets between the hosts and one or more remote nodes.

In some embodiments, the circuitry is configured to exchange the management packets by maintaining respective associations between the first and second BMC instances and the first and second hosts. In other embodiments, the circuitry is configured to maintain the associations by holding a respective different IP address for each of the first and second BMC instances. In yet other embodiments, the circuitry is configured to exchange the management packets by routing the management packets related to the first or second BMC instance based at least on one of the respective IP address and the single MAC address.

In an embodiment, the circuitry is configured to exchange the management packets by routing the management packets to and from the first or second BMC instance based on the associations. In another embodiment, the circuitry is configured to emulate, using the associations, a separate respective NIC for each of the first and second BMC instances.

In some embodiments, the network adapter includes physical interfaces of two or more different types for exchanging the management packets, and the circuitry is configured to select a physical interface for each of the first and second BMC instances based on the respective associations. In other embodiments, the circuitry is configured to transition from using a physical interface of a first type by one of the first and second BMC instances to using a physical interface of a second different type by the same BMC instance. In yet other embodiments, the circuitry is configured to transition from using the physical interface of the first type when the physical interface of the first type becomes unavailable.

In an embodiment, the circuitry is configured to identify a management packet that is destined for multiple BMC instances, to send the identified management packet to the BMC only once when the BMC supports duplication of packets to multiple BMC instances, and to send a respective duplicate of the identified management packet to each of the BMC instances to which the identified packet is destined, otherwise.

There is additionally provided, in accordance with an embodiment that is described herein, a method for remote management in a network node that includes multiple hosts and a Baseboard Management Controller (BMC) that runs at least first and second BMC instances that share a single MAC address and are associated respectively with first and second hosts. The method includes exchanging, over a communication network, management packets between a control server and the BMC using a network adapter. Using the network adapter, data packets are exchanged between the hosts and one or more remote nodes, over the communication network.

There is additionally provided, in accordance with an embodiment that is described herein, a network node that includes multiple hosts, a Baseboard Management Controller (BMC) and a network adapter. The BMC is configured to run at least first and second BMC instances that share a single MAC address, and are associated respectively with first and second hosts. The network adapter is configured to exchange, over a communication network, management packets between a control server and the BMC, and to exchange, over the communication network, data packets between the hosts and one or more remote nodes.

The present invention will be more fully understood from the following detailed description of the embodiments thereof, taken together with the drawings in which:

DETAILED DESCRIPTION OF EMBODIMENTS

Overview

Figure 1:
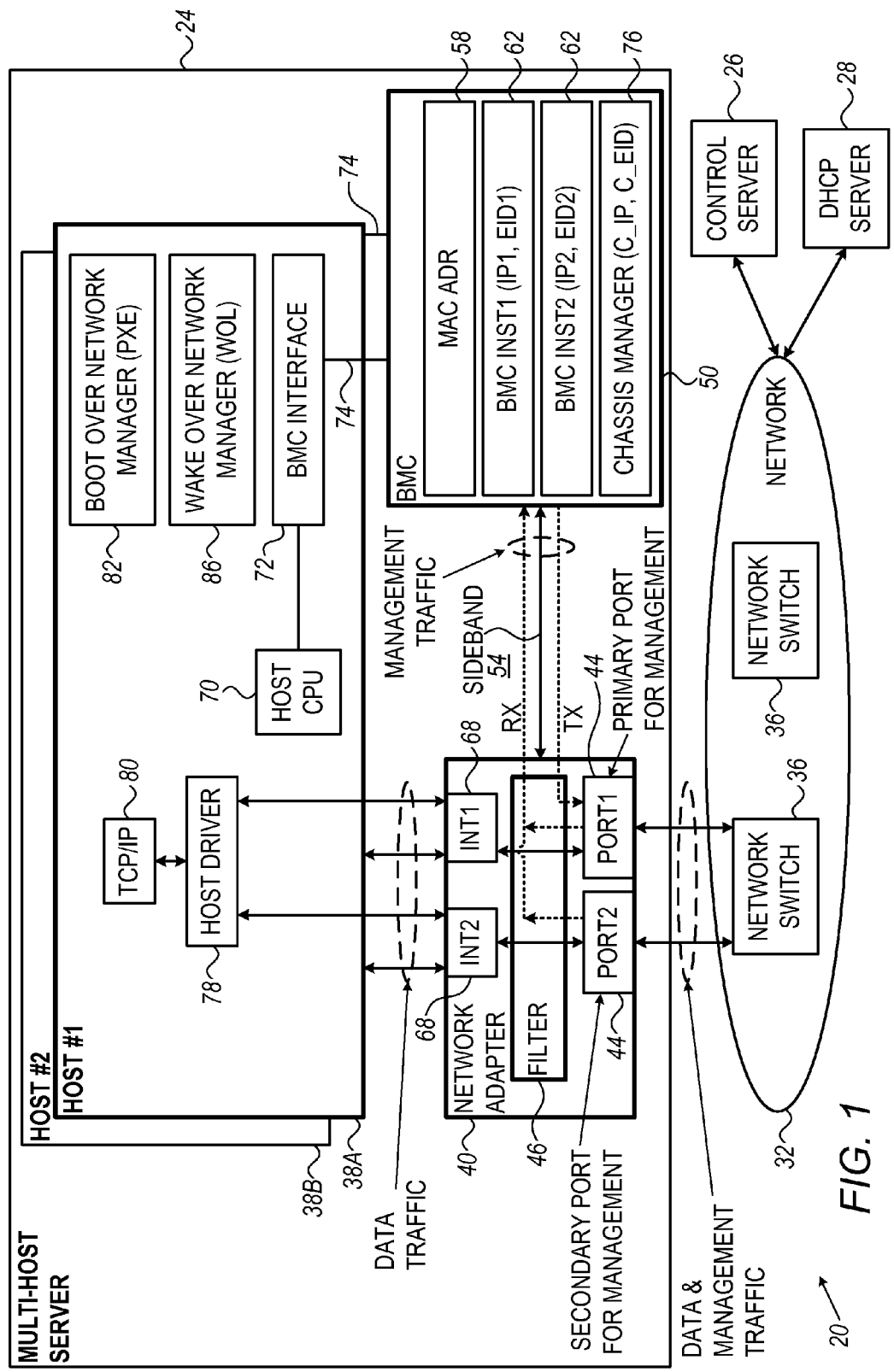
FIG. 1 is a block diagram that schematically illustrates a computer system, including a remotely managed multi-host server, in accordance with an embodiment that is described herein.

In managing large computing systems, compute servers are sometimes equipped with a Baseboard Management Controller (BMC) for remote monitoring and control of the compute server. A compute node is also referred to herein as a network node or a server. A control server executing a management program communicates management traffic with the BMC over a communication network and via a network adapter of the compute server. Other network nodes, and possibly the control server as well, exchange data traffic with the host of the compute node over the network.

To communicate management traffic, the network adapter and BMC typically interconnect using a dedicated bidirectional sideband channel. Standard interfaces for the sideband channel include, for example, the Network Controller Sideband Interface (NC-SI) and the Management Component Transport Protocol (MCTP). The standard interfaces are designed to control a single host using a single BMC.

Embodiments that are described herein provide improved methods and systems for remote control of multiple hosts in a network node having a network adapter and a Baseboard Management Controller (BMC). The BMC runs multiple management instances, each controlling a respective host. In the disclosed embodiments, at least two of the BMC instances share a single MAC address. Since a single MAC address is insufficient for distinguishing among the BMC instances, the BMC and network adapter use IP addresses that are respectively assigned to the BMC instances that share a single MAC address.

In the description that follows, we refer mainly to a case in which the BMC runs multiple BMC instances that all share a single MAC address. This limitation, however, is not mandatory and serves only for the sake of description clarity. The disclosed techniques are similarly applicable to situations in which the BMC instances in a partial subset of the BMC instances share a single MAC address. Multiple subsets of BMC instances, each having a different respective single MAC address are supported as well.

In the disclosed embodiments, the BMC and network adapter share and maintain associations between the BMC instances and respective hosts. The associations may be predefined in the network adapter and BMC. Alternatively, the associations are determined by the BMC and sent to the network adapter over the sideband channel. Further alternatively, the associations may be configured in the BMC and network adapter by a system administrator.

In an embodiment, the associations comprise a respective IP address for each BMC instance, and possibly the MAC address of the BMC. By assigning IP addresses to the BMC instances, the network adapter can communicate separately with each BMC instance, even though the BMC supports only a single MAC address.

In some embodiments, the network adapter comprises a filter unit that serves for packet filtering and routing. The filter unit routes the management packets related to a given BMC instance based at least on one of the respective IP address and the BMC MAC address. In other embodiments, configuring the filter unit for routing the management packets to and from a given BMC instance is based on the associations. Various packet filtering criteria are described, for example, in the NC-SI specifications cited below.

In some embodiments, the sideband channel comprises physical media (i.e., physical interfaces) of two or more types for exchanging the management packets with the BMC. Example physical media types include the Reduced Media Independent Interface (RMII) Based Transport (RBT), the System Management Bus (SMBus) and the PCI Express (PCIe) bus. In such embodiments, the network adapter selects a physical medium for each of the BMC instances, based, for example, on the respective associations.

In some embodiments, the management traffic includes management packets that are each destined to more than one BMC instance, such as multicast and broadcast packets. The network adapter identifies a management packet to be delivered to multiple BMC instances over RBT, and sends the identified management packet to the BMC only once when the BMC supports duplication of packets to multiple BMC instances, and to send a respective duplicate of the identified management packet to each of the BMC instances to which the identified packet is destined, otherwise.

In an embodiment, the network adapter transitions from using a physical medium of a given type by a given BMC instance to using a physical medium of a different type by the same BMC instance. For example, the network adapter may transition from one medium type to another when the currently used medium becomes unavailable. As another example, the network adapter may transition to another medium type under the control of the BMC or BMC instance when the transition enables the respective BMC instance to exchange the management traffic at a different data rate as appropriate.

In the disclosed techniques, a multi-host server comprises a BMC that a supports a single MAC address and a network adapter. The BMC runs multiple BMC instances that are associated with the multiple hosts. By maintaining the same associations between BMC instances and hosts in the BMC and network adapter, the network adapter emulates for a remote control server a separate and independent communication link with each of BMC instances.

System Description

FIG. 1 is a block diagram that schematically illustrates a computer system 20, including a remotely managed multi-host server 24, in accordance with an embodiment that is described herein. System 20 can be used in various applications, such as in server farms, campus or industrial computation systems, storage systems, data center systems and the like.

System 20 typically comprises multiple network nodes such as server 24 (the figure depicts only one node, for clarity) that can each be remotely controlled by a control server 26. In the description that follows, the terms "server" and "network node" (or simply node for brevity) are used interchangeably. Node 24 and control server 26 communicate with one another over a communication network 32. In the example of FIG. 1, network 32 comprises multiple network switches 36 that deliver the communicated data among the network nodes, and between the control server and the nodes. In alternative embodiments, instead of or in addition to switches 36, any other suitable switching and/or routing network components can be used also.

Network 32 may comprise any suitable type of communication network and related protocols. For example, the network may comprise a local or a wide area network (WAN/LAN), a wireless network, or a combination of such networks. Additionally, the network may be a packet network such as IP (e.g., with TCP as the transport protocol), Infiniband, or Ethernet network, delivering information at any suitable data rate. In the present example, a Dynamic Host Configuration Protocol (DHCP) server 28 is connected to network 32, for dynamically distributing IP addresses to network elements, on demand.

Server 24 comprises multiple hosts 38 and a Network Interface Controller (NIC) 40, which is also referred to as a network adapter. In the example of FIG. 1, network adapter 40 comprises two network ports 44, denoted PORT1 and PORT2. In alternative embodiments, network adapter 40 may comprise any other suitable number of network ports. Network ports 44 serve as a physical and electrical interface to network adapter 40. A network port (or simply port for brevity) is also referred to as a channel.

Network adapter 40 comprises a filter 46 that uses for packet routing. For example, using predefined or configurable routing rules filter 46 separates between incoming network data packets that are destined to one of hosts 38, and management packets that are not destined to the hosts. Other routing paths in filter 46 are described below. The routing rules in filter 46 may be based, among other parameters, on MAC and/or IP addresses, as will be described in detail below.

Node 24 further comprises a Baseboard Management Controller (BMC) 50, which communicates with network adapter 40 over a dedicated sideband channel 54. BMC 50 sends and receives management packets to and from network via network adapter 40 and sideband channel 54. In some embodiments, network adapter 40 receives from BMC 50 control packets that are used, for example, for internal configuration and query of the network adapter. Network adapter 40 typically responds to such a control packet by sending back to BMC 50 a respective response message over sideband channel 54. Example sideband channels and related protocols are described below.

In the embodiments that are disclosed herein, BMC 50 supports only a single Media Access Control (MAC) address 58 that uniquely identifies the BMC over other elements that access network 32. BMC 50 monitors and controls hosts 38 independently from one another using multiple respective management instances 62. Management instances 62 are also referred to herein as BMC instances. In the disclosed embodiments, separating among BMC instance 62 within BMC 50 is based on assigning IP addresses to the BMC instances as will be described below.

In some embodiments, BMC 50 defines associations between BMC instances 62 and respective hosts 38. In the example of FIG. 1, BMC INST1 may be associated with host 38A and BMC INST2 may be associated with host 38B. Additionally, BMC 50 assigns IP addresses to BMC instances 62. In some embodiments, BMC 50 assigns a different IP address to each BMC instance 62. In the description that follows the term "BMC-host association" (or simply association for brevity) refers to an association that BMC 50 defines between a given BMC instance and the respective host.

BMC 50 sends to network adapter 40 the BMC-host associations including the IP addresses that were assigned to the BMC instances. In an embodiment, network adapter 40 maintains the associations and IP addresses to be used for packet routing. Using the same BMC-host associations in BMC 50 and network adapter 40 enables the network adapter to emulate separate network adapters for the respective BMC instances. Note that although the network adapter and BMC maintain the same BMC-host associations, the network adapter and BMC may hold the BMC-host associations using different data structures, as appropriate.

Each host 38 comprises at least one CPU 70 that carries out the various tasks of host 38. Host 38 further comprises a BMC interface 72, which connects the host to BMC 50 over a bus 74. A BMC instance 62 of BMC 50 can access its respective host 38, via bus 74, for monitoring the health of the host and for applying suitable actions when detecting malfunctions. For example, a given BMC instance 62 can monitor its managed host periodically, or in response to receiving suitable commands from the remote control server and, for example, reset the respective managed host (via bus 74 and BMC interface 72) as required.

Bus 74 may comprise any bus suitable for connecting BMC 50 to hosts 38 directly. In some embodiments, bus 74 comprises a separate connection for each host 38 (e.g., per a BMC instance). In other embodiments, bus 74 is shared among multiple hosts. In an example embodiment, bus 74 comprises the Peripheral Component Interface Express (PCIe) bus. In typical implementations, bus 74 is separate from sideband channel 54.

Control server 26 typically executes a dedicated management and control program. The control program may control one or more hosts 38 in server 24 for which BMC associates a respective BMC instance 62. Control server 26 may control multiple network nodes, as well as multiple hosts that belong to the same or different network nodes, which are accessible via network 32. The program may execute control and monitor operations automatically, or triggered by a human user via a suitable user interface (not shown).

In the embodiments described above, control server typically comprises a separate server that controls multi-host server 24 or hosts 38 thereof over network 32. In these embodiments, management traffic that is exchanged between the control server and BMC 50 flows through ports 44 of network adapter 40 and sideband channel 54. In another embodiment, the functionality of control server 26 is executed by one of hosts 38 in a multi-host server such as server 24. In this embodiment, the control server can access BMC 50 on the same server via the NIC and the sideband channel, without passing through any of ports 44.

To communicate with a remote node 24, control server sends and receives, via switches 36 of network 32, management messages that create network management traffic. Management traffic sent by control server 26 may arrive at PORT1, PORT2, or both. Management traffic sent by BMC 50 (e.g., originated by BMC instances 62) is typically delivered through one of the ports to the network, and via switches 36 to control server 26. In some embodiments, the control functionalities that are carried out by control server 26 can be implemented on one or more servers 24.

Control server 26 manages hosts 38 via respective BMC instances 62 independently from one another. When control server 26 sends management traffic to a given BMC instance 62, the management packets typically include the IP address that BMC 50 has assigned to this BMC instance. Filter 46 in network adapter 40 directs the management packets to the relevant BMC instance based at least on the MAC address of BMC 50 and on the respective IP address of the BMC instance. BMC 50 then provides the management packets to the respective BMC instance based on the respective BMC-host association. Note that using the described flow, each BMC instance 62 has a separate logical communication link with control server 26.

BMC instance 62 receives management instructions from control server 26 and executes them accordingly. For example, BMC instance 62 may receive from control server 26, management instructions to measure the temperature in the chassis of server 24 or internally in a respective host 38 and send the measured temperature back to control server 26. Additionally, BMC instance 62 may be configured to monitor various activities that server 24, respective host 38 or both carry out during their operation, and to send monitoring reports or certain alerts when failure events occur, to control server 26.

In some embodiments, BMC 50 comprises a chassis manager 76, which enables control server 26 to monitor and control common or shared node status and resources of the server, separately from BMC instances 62. In some embodiments, chassis manager 76 executes monitor and control tasks that are related to the server as a whole (rather than per host). For example, chassis manager 76 can be configured to monitor and control operational attributes of server 24 such as, for example, chassis temperature, power supply, cooling fans and the like, instead of, or in addition to BMC instances 62. Although in server 24 of FIG. 1, chassis manager 76 uses the same sideband channel as BMC instances 62, in alternative embodiments, chassis manager 76 may use a sideband channel that is separate from the sideband channel (or channels) used by BMC instances 62. For example, when the BMC instances communicate with the respective hosts over a PCIe bus, the chassis manager uses a physical medium other than PCIe for sideband communication.

Sideband channel 54 may comprise any suitable buses, interfaces, and protocols. For example, in some embodiments sideband channel 54 comprises the Network Controller Sideband Interface (NC-SI) over Management Component Transport Protocol (MCTP) over System Management Bus (SMBus), or over the Peripheral Component Interface Express Bus (PCIe). Alternatively, sideband channel 54 comprises the Network Controller Sideband Interface (NC-SI) over a Reduced Media Independent Interface (RMII) Based Transport (RBT).

When using the NC-SI over MCTP over the Peripheral Component Interface Express Bus (PCIe), the sideband channel shares a common physical bus with host 38 (not shown). In some embodiments, each BMC instance 62 may use one of a plurality of management channels as defined in MCTP, and/or RBT as defined in NC-SI.

Any suitable binding method can be used among the above mentioned protocols and underlying physical layer interfaces. Example combinations include NC-SI over RBT, NC-SI over MCTP over PCIe, NC-SI over MCTP over SMBus.

The MTCP and NC-SI specifications are described, for example, in the Distributed Management Task Force (DMTF) standards "Management Component Transport Protocol (MCTP) Base Specification," Document Number: DSP0236, Jan. 24, 2013, version 1.2.0, and "Network Controller Sideband Interface (NC-SI) Specification," Document Number: DSP0222, Jan. 24, 2013, version 1.0.1, and "NC-SI over MCTP Binding Specification," Document Number: DSP0261, Aug. 22, 2013, version 1.0.0, which are all incorporated herein by reference.

The SMBus specifications are described, for example, in "System Management Bus (SMBus) Specification," Dec. 20, 20014, version 3.0, which is incorporated herein by reference. RBT is defined, for example, within the NC-SI specifications cited above.

MCTP and SMBus binding is described, for example, in the DMTF standard "Management Component Transport Protocol (MCTP) SMBus/I2C Transport Binding Specification," Document Number: DSP0237, Jul. 28, 2009, version 1.0.0, which is incorporated herein by reference. MCTP and PCIe binding is described, for example, in the DMTF standard "Management Component Transport Protocol 6 (MCTP) PCIe VDM Transport Binding Specification," Document Number: DSP0238, Dec. 7, 2014, version 1.0.2, which is incorporated herein by reference.

In some embodiments, sideband channel 54 comprises multiple physical media and related protocols. In an example embodiment, sideband channel 54 comprises an RBT bus, an SMBus and a PCIe bus. BMC 50 may select for each BMC instance 62 one of the media over which to communicate with network adapter 40. Moreover, in some embodiments, for a given BMC instance may communicate over different media at different times. For example, a BMC instance may first communicate over the PCIe bus, and when the PCIe bus becomes unavailable, to switch of the SMBus. In some embodiments, the transition from one media to another is under the control of BMC 50, e.g., by first instructing the network adapter to deselect the currently used media and then instructing the network adapter to select a different media.

Network adapter 40 handles bidirectional data and management traffic between switch 36 to which it connects, and hosts 38 and BMC 50, respectively. Server may communicate data traffic with other servers or devices (e.g., such as servers 24) or control server 26. As noted above, network adapter 40 separates between traffic exchanged with different hosts 38 and between incoming management and data traffic, using predefined or configurable routing rules within filter 46. Network adapter 40 directs data traffic arriving at PORT1 and PORT2 to network communication interfaces 68 (i.e., of the relevant host), denoted INT1 and INT2, respectively. The network adapter directs management traffic to BMC 50 which provides the management traffic to a specific BMC instance 62 or to chassis manager 76.

Data traffic arriving at PORT1 and PORT2 is forwarded from network adapter 40 trough INT1 and INT2 and via a bonding driver 78 to a TCP/IP module 80, to process the TCP and IP communication protocols. Bonding driver 78 can additionally handle link aggregation. Aspects of link aggregation are addressed, for example, in U.S. patent application Ser. No. 14/547,160, filed Nov. 19, 2014, which is assigned to the assignee of the present patent application and whose disclosure is incorporated herein by reference.

Host 38 further comprises a boot over the network manager 82, and a wake over the network manager 86. Manager 82 may be implemented as a software client that host 38 executes to support the network boot functionality. Wake over the network manager 86 is typically implemented as a combination of network adapter and configuration software, to support the network wakeup functionality. Boot over the network manager 82 enables a remote node to cause server 24 to re-boot, by loading boot management programs and related resources that are stored on other network servers.

Boot over the network manager 82, may comprise, for example, the Preboot Execution Environment (PXE), which is described, for example, in "Preboot Execution Environment (PXE) Specification," Sep. 20, 1999, version 2.1, which is incorporated herein by reference. Wake over the network manager 86 may be implemented, for example, in combination of hardware and software, so as to recognize an incoming dedicated "magic packet" sent to wake the server up from a sleep or standby state. Manager 86 may comprise, for example, the Wake-On-LAN (WOL) protocol. Specifications for the magic packet are described, for example, in an AMD white-paper titled "Magic Packet Technology," publication number 20213, revision A, Amendment/0, November 1995, which is incorporated herein by reference.

In some embodiments, BMC instance 62 may query the internal state of manager 82, 86 or both is respective host 38, and report the states to control server 26 over the network.

The system configuration of FIG. 1, including the server, host, and network adapter configurations, are exemplary configurations, which are shown purely for the sake of conceptual clarity. Any other suitable system, server, host and/or network adapter configuration can also be used. Elements that are not necessary for understanding the principles of the disclosed embodiments, such as various interfaces, addressing circuits, timing and sequencing circuits and debugging circuits, have been omitted from the figure for clarity.

In the exemplary configuration shown in FIG. 1, network adapter 40 and BMC 50 are implemented as boards or Integrated Circuits (ICs) that are separated from the hardware of the server. In alternative embodiments, however, network adapter 40, BMC 50 or both may be integrated with the server hardware, for example, on the mother board of the server, and may be interconnected by internal buses. Further alternatively, some or all of the functionality of network adapter 40 can be implemented in software and carried out by one or more CPUs 70 of hosts 38, or other processor in the server.

In some embodiments, one or more of CPUs 70 and BMC 50 in multi-host server 24 are integrated into one hardware device, and may be interconnected by internal buses.

In some embodiments, CPU 70, BMC 50 or both comprise one or more processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

The different elements of network adapter 40 may be implemented using any suitable hardware, such as in an Application-Specific Integrated Circuit (ASIC) or Field-Programmable Gate Array (FPGA). In some embodiments, some elements of network adapter 40 can be implemented using software, or using a combination of hardware and software elements.

In the context of the present disclosure and in the claims, the term "circuitry" refers to the elements of network adapter 40, excluding ports 44. The circuitry thus includes at least filter 46 and interfaces 68 described above.

Managing Multiple Management Instances

Figure 2:
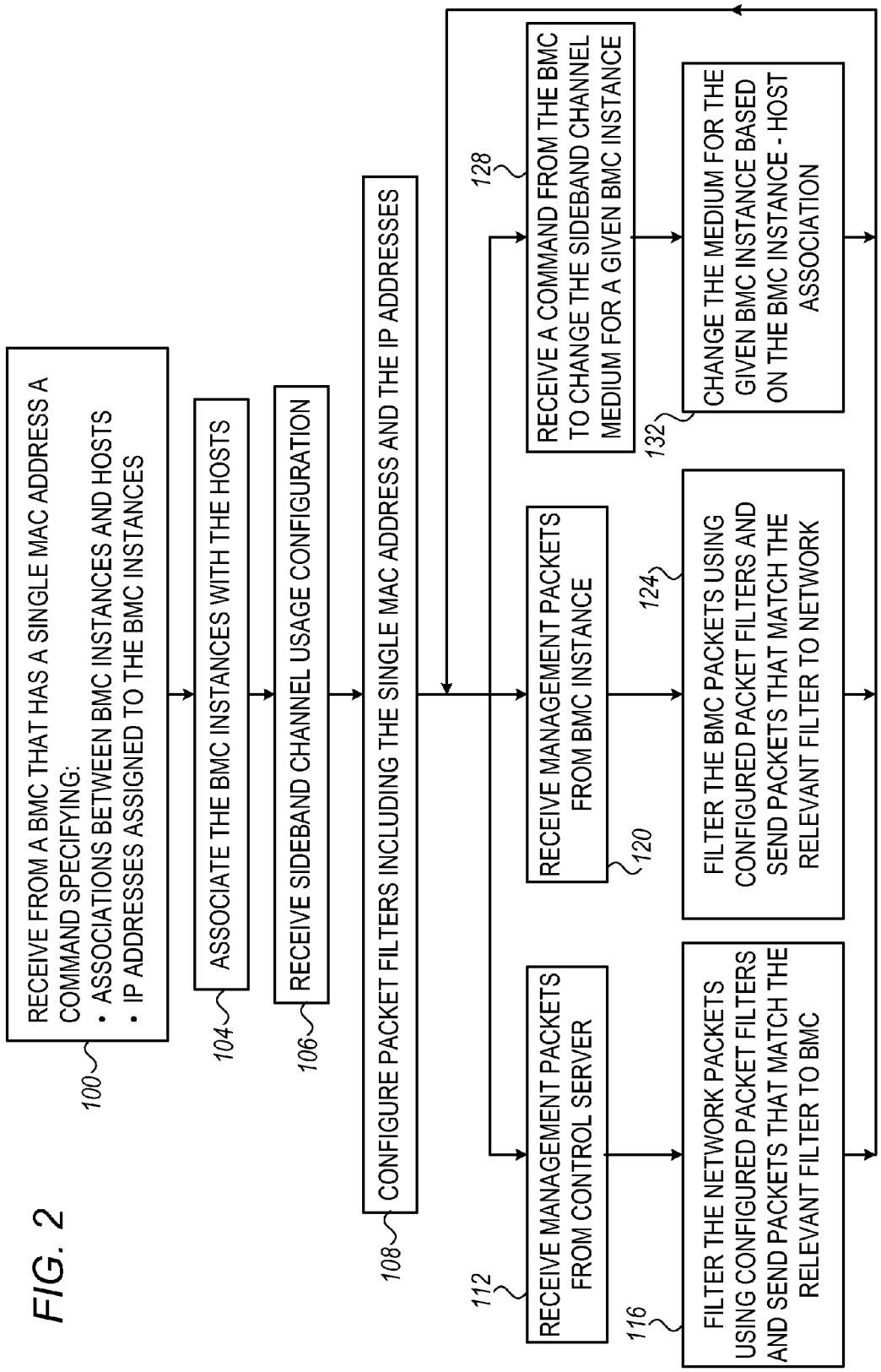
FIG. 2 is a flow chart that schematically illustrates a method for sideband communication between a Network Interface Controller (NIC) and a Baseboard Management Controller (BMC) that runs multiple management instances, in accordance with an embodiment that is described herein.

FIG. 2 is a flow chart that schematically illustrates a method for sideband communication between a Network Interface Controller (NIC) and a Baseboard Management Controller (BMC) that runs multiple management instances, in accordance with an embodiment that is described herein. The method is described with reference to NIC 40 and BMC 50 in multi-host server 24 of FIG. 1 above.

In the method of FIG. 2 we assume that the sideband channel between NIC 40 and BMC 50 comprises three physical media: RBT, SMBus and PCIe. Depending on the underlying media, the protocol used is NC-SI over RBT, NC-SI over MCTP over SMBus and NC-SI over MCTP over PCIe, respectively. The above media and protocols are not mandatory, and the disclosed method is applicable to any other suitable physical media and protocols.

The method begins at a configuration receiving step 100, in which NIC 40 receives from BMC 50 a configuration command. The command should be typically issued separately per each port (channel) 44. Alternatively, the configuration command may refer to configuring multiple ports 44 of NIC 40. An example configuration command is given in Table 1 of appendix below.

The configuration command received at step 100 specifies associations between BMC instances 62 and respective hosts 38 as were defined by BMC 50. The configuration command further comprises MAC address 58 of BMC 50 and IP addresses that BMC 50 has respectively assigned to the BMC instances. BMC 50 can, for example, assign predefined static IP addresses or dynamic IP addresses that may be provided, for example, by DHCP server 28.

In an embodiment, the configuration command at step 100 further comprises MTCP related configurations, such as, for example, the Endpoint ID (EID) and respective mapped physical address that are assigned by the MCTP to the SMBus and PCIe interfaces at the BMC side. In some embodiments, BMC 50 assigns (i.e., using MCTP) a different EID to each BMC instance. In some embodiments, the configuration command at step 100 additionally lists the supported physical media and protocols for the sideband channel, the availability of the supported media and the like.

In some embodiments, chassis manager 76 (or BMC 50) implements a DCHP relay agent for obtaining IP addresses from DHCP server 28. A DHCP relay agent for version 4 of the IP protocol is described, for example, by the Network Working Group of the Internet Engineering Task Force (IETF®), in "DHCP Relay Agent Information Option," Request for Comments (RFC) 3046, January, 2001, which is incorporated herein by reference. A DHCP relay for version 6 of the IP protocol is described, for example, by the IETF® in "Lightweight DHCPv6 Relay Agent," RFC 6221, May, 2011, which is incorporated herein by reference.

At an association step 104, NIC 40 holds and maintains associations between the BMC instances and the hosts as specified in the configuration command of step 100. Since NIC 40 and BMC 50 maintain the same associations between the BMC instances and respective hosts, NIC 40 effectively emulates a separate NIC for each BMC instance and associated host. Thus, control server 26 can communicate with each BMC instance separately.

At a sideband configuration step 106, NIC 40 receives from BMC 50 a command that specifies which media of the sideband channel is assigned for each BMC instance. NIC 40 then internally configures the sideband channel usage per BMC instance.

At a filter configuration step 108, NIC 40 configures the routing rules within filter 46 based on the information provided in the configuration command of step 100. Filter 46 may implement the routing rules using any suitable method. In an example embodiment, filter 46 implements the routing rules using configurable packet filters. A packet filter typically compares between certain fields in a received packet such as the MAC and IP addresses and expected predefined values for these fields, and forwards the packet to a predefined destination when a match occurs.

NIC 40 may configure the routing rules within filter 46 in various ways. In some embodiments, NIC 40 configures, per BMC instance, a routing rule (e.g., a packet filter) for unicast packets that is based on the respective IP address and possibly also on the BMC MAC address. NIC 40 can additionally configure other filtering rules (e.g., packet filters) for multicast and broadcast packets. Using separate sets of routing rules for each BMC instance enables the NIC to emulate a separate virtual NIC per each BMC instance and the chassis manager.

At a network traffic receiving step 112, NIC 40 receives from control server 26 management traffic over network 32. At a filtering step 116, filter 46 applies the routing rules to the received management packets and routes the packets accordingly. For example, filter 46 may filter received packets using the packet filters that were configured at step 108 above, and send those packets that match a given packet filter to the respective BMC instance 62 in BMC 50 over sideband 54.

In some embodiments, NIC 40 supports routing management packet that are destined to multiple BMC instances. Such packets include, for example, multicast and broadcast packets. In an embodiment, when using the NC-SI protocol over RBT for the sideband channel, NIC 40 sends each multicast or broadcast packet only once to BMC 50. BMC 50 then duplicates the multicast or a broadcast packet for all the BMC instances to which the packet was destined.

Alternatively or additionally, when using NC-SI over MCTP over SMbus, or NC-SI over MCTP over PCie, NIC 40 sends each multicast or broadcast packet that are destined to multiple BMC instances to each of the destined BMC instances based on the EID that was assigned to the BMC instance. BMC 50 receives the duplicate multicast and broadcast packets over the relevant medium of the sideband channel and delivers the packets to the respective BMC instances.

In some embodiment, different BMC instances may use different physical media types and related protocols of the sideband channel. For example, some of the BMC instances may use NC-SI over RBT and other BMC instances may use NC-SI over MCTP. In such embodiments, the methods for routing multicast and broadcast packets described above are applied to each BMC instance in accordance with the medium type and protocol used.

At a BMC traffic receiving step 120, NIC 40 receives management traffic from BMC 50 over sideband channel 54. The management traffic may be generated by a BMC instance 62 or by a chassis manager 76. At a BMC traffic filtering step 124, filter 46 applies to the received management packets routing rules (e.g., using packet filters) that are configured for the BMC to control server direction. These rules may be based, for example, on the source and/or destination IP addresses of the packets. NIC 40 then routes packets that match a relevant packet filter or rule in filter 46 to the network (e.g., to the control server or to the DHCP server) via one of ports 44.

At a medium change command reception step 128, NIC 40 receives from a given BMC instance 62 a command to transition from the medium type that is currently used for the sideband channel to another different medium type. In the example method of FIG. 2, each BMC instance may communicate over the sideband channel using one of the media types RBT, SMBus and PCIe.

At a transition step 132, NIC 40 applies the media transition in accordance with the command received at step 120. In some embodiments, the media transition is carried out in two steps. First BMC instance 62 instructs the NIC to deselect (deactivate) the currently used media, and then the BMC instance instructs the NIC to select and activate another media for the BMC instance. In an embodiment, the media transition commands are based on the package select and deselect commands of the NC-SI standard cited above. An example command that encapsulates an NC-SI command for a given host or BMC instance is given in Table 2 of the appendix.

Following each of steps 116, 124 and 132, the method loops back to step 112 or 120 to receive subsequent management packets, or to step 128 to receive subsequent commands for media transition.

The method of FIG. 2 above is given by way of example and other suitable methods can also be used. For example, in some embodiments, the BMC and NIC exchange, over the sideband channel, packets that are not related to network traffic. Such packets may include, for example, command packets from the BMC to the NIC and response packets from the NIC to the BMC. In some embodiments, the NIC additionally informs the BMC of various events using, for example, Asynchronous Event Notification (AEN) packets as defined in the NC-SI specifications cited above.

In the example method of FIG. 2, at step 128, during the exchanging of the management packets with the NIC, the BMC sends to the NIC a command to change the type of physical medium used for the sideband channel. In alternative embodiments, while communicating management packets with the NIC, the BMC can send to the NIC other suitable commands, such as, for example, a command to change the packet filtering settings. Further alternatively, the BMC can send to the NIC, during operation, any suitable NC-SI encapsulated packet, as described, for example, in Table 2 of the appendix below.

Although the embodiments described herein mainly address managing a multi-host server, the methods and systems described herein can also be used in other applications, such as in managing other multi-instance network devices such as network switches.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Appendix

The appendix includes example configuration commands that a BMC running multiple BMC instances can use to configure and query the NIC, in accordance with an embodiment of the present invention.

TABLE 1

A Command for configuring host-BMC instance associations in the NIC.

| Byte | Bits | | | |
|---|---|---|---|---|
| | 31:24 | 23:16 | 15:8 | 7:0 |
| 0 ... 15 | NC-SI Header (OEM Command) | | | |
| 16:19 | Manufacture ID (IANA) | | | |
| 20:23 | Command rev | Cmd ID = 0x01 | Parameter = 0x07 | Host Number |
| 24:27 | MC MAC Address Byte 5 | MC MAC Address Byte 4 | MC MAC Address Byte 3 | MC MAC Address Byte 2 |
| 28:31 | MC MAC | MC MAC | Supported | MC SMBus |

TABLE 1-continued

A Command for configuring host-BMC instance associations in the NIC.

| | Bits | | | |
|---|---|---|---|---|
| Byte | 31:24 | 23:16 | 15:8 | 7:0 |
| | Address Byte 1 | Address Byte 0 | Media Status | EID |
| 32:35 | SMBus INDX | MC SMBus Address | MC PCIe EID | PCIe INDX |
| 36:39 | MC PCIe Address MSB | MC PCIe Address LSB | IP Filter Mode | Reserved |
| 40:43 | MC IPv4 Address | | | |
| 44:47 | MC IPv6 Link Local Address | | | |
| 48:51 | MC IPv6 Link Local Address | | | |
| 52:55 | MC IPv6 Link Local Address | | | |
| 56:59 | MC IPv6 Link Local Address | | | |
| 60:63 | MC IPv6 Global Address | | | |
| 64:67 | MC IPv6 Global Address | | | |
| 68:71 | MC IPv6 Global Address | | | |
| 72:75 | MC IPv6 Global Address | | | |
| 76:79 | Checksum 31:0 | | | |

TABLE 2

A command that encapsulates a NC-SI command for a specific host/BMC instance.

| | Bits | | | |
|---|---|---|---|---|
| Byte | 31:24 | 23:16 | 15:8 | 7:0 |
| 0 . . . 15 | NC-SI Header (OEM Response) | | | |
| 16:19 | Manufacture ID (IANA) | | | |
| 20:23 | Command rev | Cmd ID = 0x14 | Parameter = 0x00 | Host Number |
| 24:N-4 | Encapsulated NC-SI command | | | |
| N-3:N-1 | Checksum 31:0 | | | |

The invention claimed is:

1. A network adapter serving a network node that comprises multiple physical hosts, the network adapter comprising:
one or more physical ports, configured to connect the network adapter to a communication network;
one or more physical host interfaces, configured to connect the network adapter to the physical hosts of the network node, and to exchange over the communication network, via the physical ports and the physical host interfaces, data packets between first and second physical hosts and one or more remote nodes;
a physical sideband interface, configured to connect the network adapter to a hardware-implemented Baseboard Management Controller (BMC), which runs at least first and second BMC instances that are assigned a single shared Medium Access Control (MAC) address and are associated respectively with the first and second physical hosts; and
circuitry that comprises one or more packet filters and that is connected to the physical ports and to the physical sideband interface, is configured to:
separate between the data packets and the management packets, using the packet filters, based at least on the single shared MAC address assigned to the first and second BMC instances; and
exchange over the communication network, via the physical ports and the physical sideband interface, the management packets between the BMC and a control server.

2. The network adapter according to claim 1, wherein the circuitry is configured to exchange the management packets by maintaining respective associations between the first and second BMC instances and the first and second hosts.

3. The network adapter according to claim 2, wherein the circuitry is configured to maintain the associations by holding a respective different IP address for each of the first and second BMC instances.

4. The network adapter according to claim 3, wherein the circuitry is configured to exchange the management packets by routing the management packets related to the first or second BMC instance based at least on one of the respective IP address and the single MAC address.

5. The network adapter according to claim 2, wherein the circuitry is configured to exchange the management packets by routing the management packets to and from the first or second BMC instance based on the associations.

6. The network adapter according to claim 2, wherein the circuitry is configured to emulate, using the associations, a separate respective NIC for each of the first and second BMC instances.

7. The network adapter according to claim 2, wherein the physical sideband interface comprises physical sideband interfaces of two or more different types for exchanging the management packets, and wherein the circuitry is configured to select a respective one of the physical sideband interfaces for each of the first and second BMC instances based on the respective associations.

8. The network adapter according to claim 7, wherein the circuitry is configured to transition from using one of the physical sideband interfaces having a first type by one of the first and second BMC instances to using one of the physical sideband interfaces having a second different type by the same BMC instance.

9. The network adapter according to claim 8, wherein the circuitry is configured to transition from using one of the physical sideband interfaces of the first type when the one of the physical sideband interfaces having the first type becomes unavailable.

10. The network adapter according to claim 1, wherein the circuitry is configured to identify a management packet that is destined for multiple BMC instances, to send the identified management packet to the BMC only once when the BMC supports duplication of packets to multiple BMC instances, and to send a respective duplicate of the identified management packet to each of the BMC instances to which the identified packet is destined, otherwise.

11. A method for remote management, comprising:
in a network node that comprises multiple physical hosts, a Baseboard Management Controller (BMC) that runs at least first and second BMC instances that are assigned a single shared Medium Access Control (MAC) address and are associated respectively with first and second physical hosts, and a network adapter that comprises one or more physical ports for connecting to the communication network, one or more physical host interfaces for connecting to the physical hosts, a physical sideband interface for connecting to the BMC, and circuitry that comprises one or more packet filters and that is connected to the physical ports and to the physical sideband interface, exchanging over the communication network, via the physical ports and the physical sideband interface, management packets between a control server and the BMC; and exchanging over the communication network, via the physical ports and the physical host interfaces, data packets between the hosts and one or more remote nodes, wherein exchanging the management packets and the data packets comprises separating between the data packets and the management packets, using the packet filters, based at least on the single shared MAC address assigned to the first and second BMC instances.

12. The method according to claim 11, wherein exchanging the management packets comprises maintaining respective associations between the first and second BMC instances and the first and second hosts.

13. The method according to claim 12, wherein maintaining the associations comprises holding a respective different IP address for each of the first and second BMC instance.

14. The method according to claim 13, wherein exchanging the management packets comprises routing the management packets related to the first or second BMC instance based at least on one of the respective IP address and the single MAC address.

15. The method according to claim 12, wherein exchanging the management packets comprises routing the management packets to and from the first or second BMC instance based on the associations.

16. The method according to claim 12, and comprising emulating, using the associations, a separate respective NIC for each of the first and second BMC instances.

17. The method according to claim 12, wherein the physical sideband interface comprises physical sideband interfaces of two or more different types for exchanging the management packets, and wherein exchanging the management packets comprises selecting a respective one of the physical sideband interfaces for each of the first and second BMC instances based on the respective associations.

18. The method according to claim 17, wherein selecting the respective one of the physical sideband interfaces comprises transitioning from using one of the physical sideband interfaces having a first type by one of the first and second BMC instances to using one of the physical sideband interfaces having a second different type by the same BMC instance.

19. The method according to claim 18, wherein selecting the one of the physical sideband interfaces comprises transitioning from using the one of the physical sideband interfaces having the first type when the one of the physical interfaces of the first type becomes unavailable.

20. The method according to claim 11, wherein exchanging the management packets comprises identifying a management packet that is destined for multiple BMC instances, sending the identified management packet to the BMC only once when the BMC supports duplication of packets to multiple BMC instances, and sending a respective duplicate of the identified management packet to each of the BMC instances to which the identified packet is destined, otherwise.

21. A network node, comprising:

multiple physical hosts;

a Baseboard Management Controller (BMC) that is configured to run at least first and second BMC instances, which are assigned a single shared Medium Access Control (MAC) address and which are associated respectively with first and second physical hosts; and a network adapter that comprises one or more physical ports for connecting to a communication network, one or more physical host interfaces for connecting to the physical hosts, a physical sideband interface for connecting to the BMC, and circuitry that comprises one or more packet filters and that is connected to the physical ports and to the physical sideband interface, wherein the network adapter is configured to exchange, over a communication network, via the physical ports and the physical sideband interface, management packets between a control server and the BMC, and to exchange, over the communication network, via the physical ports and the physical host interfaces, data packets between the hosts and one or more remote nodes, and wherein the packet filters are configured to separate between the data packets and the management packets based at least on the single shared MAC address assigned to the first and second BMC instances.

* * * * *